Sept. 8, 1931.  E. N. FOX ET AL  1,822,521
PISTON ROD PACKING AND SCRAPING MEANS
Filed Sept. 9, 1927
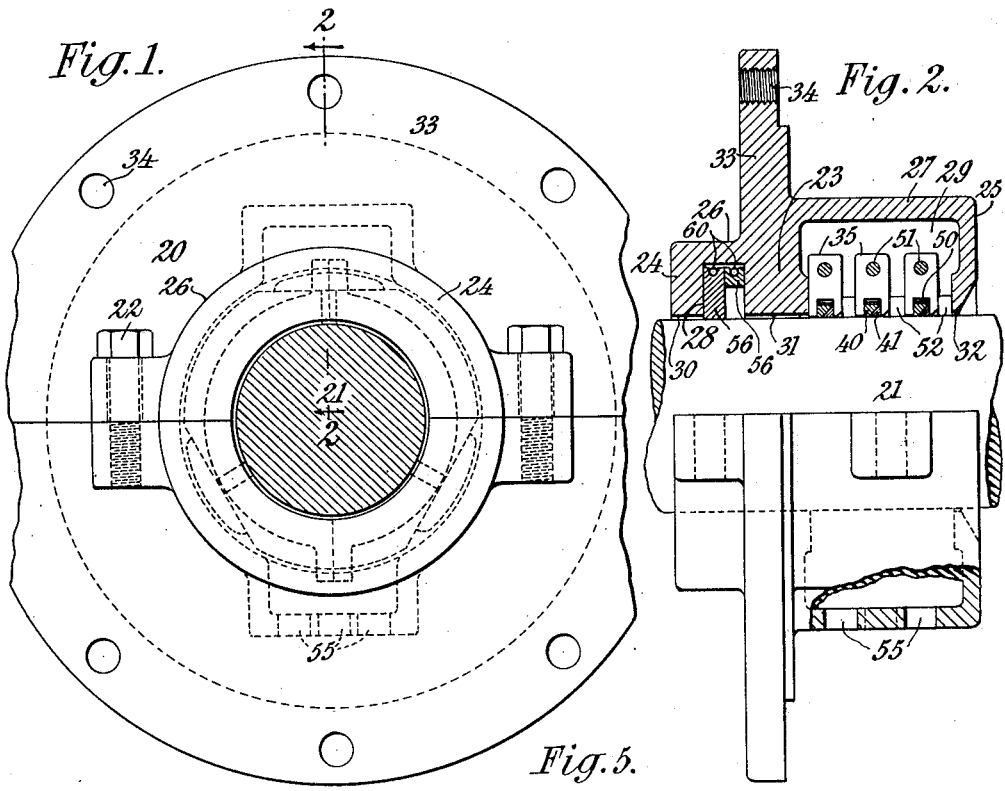
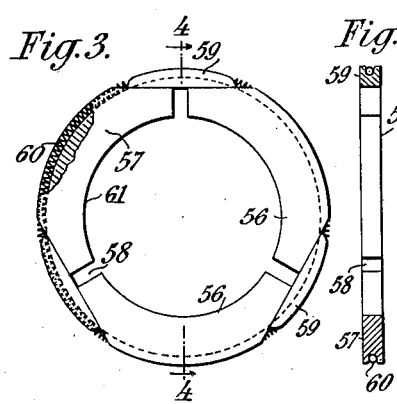
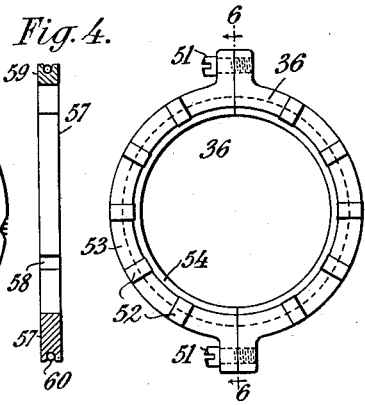
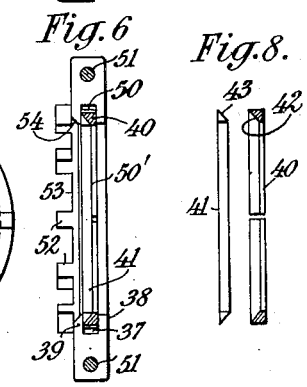
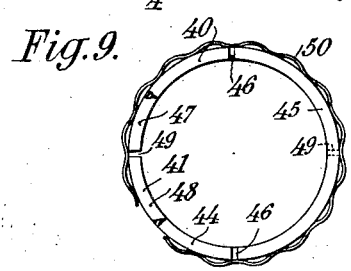
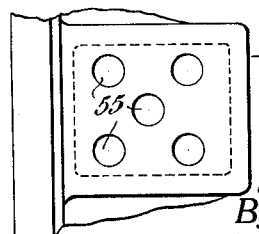
INVENTORS:
Edgar N. Fox and
Edmund Hampshire,
By Attorneys,
Fraser, Myers & Manley.

Patented Sept. 8, 1931

1,822,521

UNITED STATES PATENT OFFICE

EDGAR N. FOX AND EDMUND HAMPSHIRE, OF PALMYRA, NEW YORK, ASSIGNORS TO THE GARLOCK PACKING COMPANY, OF PALMYRA, NEW YORK, A CORPORATION OF NEW YORK

PISTON ROD PACKING AND SCRAPING MEANS

Application filed September 9, 1927. Serial No. 218,438.

This invention relates to improvements in piston rod packing and scraping means adapted for use in the packing of a piston rod and in the separation and removal of oil or other liquid from the surface of portions thereof during movement towards the packing. Although of quite general application it is especially adapted for use in the packing and scraping of reciprocating piston rods of power units having force feed and splash lubrication in the crank-case, such as vertical and horizontal steam engines, gas engines, oil engines, gas compressors, air compressors, and similar apparatus.

One object of the invention is to provide a satisfactory packing and scraping means which may be mounted in a single casing adapted to be secured to the partition plate or wall plate of the power unit in place of and as a substitute for the usual stuffing box.

Another object of the invention is to provide a piston rod scraping device having the requisite rod gripping or squeezing force required to break down the oil film or other liquid film which clings to the surface of the rod, without setting up undue frictional resistance opposing the movement of the piston rod.

A still further object of the invention is to provide a satisfactory piston rod scraping device which may be used alone, or which may be used as a part of a combined piston rod packing and scraper adapted to remove lubrication or other liquid from the piston rod and prevent the flow of steam, gas, air or other fluid in either direction, thus effectually sealing the element of the power unit to which the device is applied, when exhausted as well as when subjected to fluid pressure.

The invention includes as one of its important features a novel piston rod scraper unit which may be used alone or of which a plurality may be combined. When so combined, the units may be mounted in spaced relation in the casing, in which case ports are provided to drain off the oil or other liquid removed from the piston rod by the scraper units, and ports may also be provided in the casing in which the scraper units are mounted in order that the liquid drained through the ports of the scraper units may escape from the casing and be returned to its source of origin.

The piston rod scraper unit, which forms an important feature of the invention, comprises a sectional annulus built up of discontinuous complemental rings mounted within an annular cage adapted to encircle the piston rod and provided with resilient means whereby the rings are constantly held in close contact with each other and with the walls of the cage as well as with the surface of the piston rod, the relation of parts being such that such close contact is maintained throughout the life of the scraper notwithstanding the change of form of parts due to wear.

In the drawings illustrating the preferred form of the invention—

Figure 1 is an end view of the assembled packing and scraping device;

Fig. 2 is a side view of the same device, a part thereof being shown in longitudinal section along the plane indicated by the line 2—2 of Fig. 1;

Fig. 3 is a face view of one of the two packing rings illustrated as a part of the assembled device disclosed in Fig. 2;

Fig. 4 is a sectional view of the packing ring, the section being taken on the plane indicated by the line 4—4 of Fig. 3;

Fig. 5 is a face view of one of the scraper units, three of which are illustrated as a part of the assembled device disclosed in Fig. 2;

Fig. 6 is a sectional view of the same scraper unit, the section being taken along the plane indicated by the line 6—6 of Fig. 5;

Fig. 7 is a view of a portion of the under side of the casing in which the scraper units are housed, said view illustrating the ports through which liquid removed from the piston rod may be drained;

Fig. 8 is a sectional view through the composite annulus of one of the scraper elements, the discontinuous ring elements thereof being separated; and Fig. 9 is a face view of the composite annulus illustrated in Fig. 8, with the addition of the spring by which the discontinuous or segmental ring elements are maintained in their working relation in the assembled device, parts being indicated as being broken away to disclose underlying structure.

In the preferred form of the invention herein selected for purposes of illustration, 20 represents a casing preferably made in sections adapted to be secured about a piston rod 21 by means of bolts 22 or other suitable fastening devices. This casing 20, when intended to receive packing units as well as scraper units, may be divided into two compartments by a partition 23 (Fig. 2) between the end walls 24, 25. The partition 23 may be connected with said end walls by enclosing walls 26, 27, thereby forming two chambers 28, 29, within which the packing units and scraper units, hereinafter to be described, may be housed. The partition 23 and the walls 24 and 25 have aligned openings 30, 31, 32 therein, of a diameter such as to provide a free working clearance around the surface of the piston rod. The casing 20 may also be provided with a flange 33, having circumferentially-spaced openings 34 to receive bolts or other suitable fastening devices by which the casing may be secured to the baffle plate, partition or wall plate of the power unit to which the packing and scraping device is to be applied. When this device is applied as an improvement to power units already in use, the usual stuffing box supplied as a part of the standard equipment may be removed and the packing and scraping device embodying the present invention may be readily substituted therefor. The casing is thus firmly secured to the power unit in a concentric relation with the piston rod, the parts immediately surrounding said rod being so positioned as to be free from contact therewith.

Within the chamber 29 may be mounted the piston rod scraping means herein disclosed as three of the improved scraper units 35 constructed in accordance with this invention.

Referring more particularly to Figs. 5 and 6, each scraper unit may comprise an annular cage 36 of an internal diameter sufficient to afford a free working clearance about the piston rod with which it is intended to be used. This cage may be of appropriate form to provide an inwardly-directed chamber 37 having end walls 38, 39 between which the rings of the scraping means may be confined.

As more clearly illustrated in Figs. 8 and 9, the scraper may comprise a sectional metal annulus having a cross-sectional form preferably of greater width than depth, such annulus comprising discontinuous complemental rings 40, 41 disposed in a side-by-side relation and separated by a conical joint at the contacting complemental surfaces 42, 43. The cross-sectional form of the rings 40, 41 may preferably be such as to cause the annulus as a whole to have a rectangular form in cross-section of a width equal to the space between the inner surfaces of the walls 38, 39 of the cage, as indicated in Fig. 6. Each of the rings 40, 41 is preferably discontinuous and of such dimensions circumferentially as to cause the opposed ends to be slightly separated when in use. In the preferred form of the invention as illustrated in Fig. 9, the ring 40 is disclosed as comprising two segments 44, 45 having their ends separated as at 46, and the ring 41 is disclosed as comprising two segments 47, 48 having their ends separated as at 49.

The segments of the rings 40, 41 may be held in close contact with each other, with the walls 38, 39 of the cage, and with the surface of the piston rod, by any appropriate resilient means such, for example, as a spring 50 (Figs. 6 and 9), which may be caused by means to be hereinafter described, to embrace and tend to contract the ring 40. Due to the conical form of joint which separates the rings 40, 41, the contraction of the ring 40 will exert a wedge-like action on the complemental ring 41 and tend to cause the two rings to be spread laterally until their outwardly-directed faces are brought into close contact with the walls 38, 39 of the cage. The contracting effect of the spring will also cause the inner cylindrical surfaces of the rings to be maintained in snug scraping contact with the surface of the piston rod on which the scraper is used. The parts by which this effect is accomplished will be self-adjustable and will always maintain the rings in close contact with each other as well as in close contact with the surface of the piston rod and the inner surfaces of the walls 38, 39 of the cage. If, for example, it be assumed that the relative forms of the two rings are such that the inner surface of the ring 41 is brought in contact with the surface of the piston rod, and the other surfaces of the two rings are brought in contact with the walls of the cage, before the ring 40 has been contracted sufficiently to bring its inner surface in contact with the piston rod, the ring 41 only will be worn away by the piston rod until the inner surface of the ring 40 is permitted to contract and receive its due proportion of wear. On the other hand, if it be assumed that the forms of the two rings are such that the inner surface of the ring 40 is brought in contact with the surface of the piston rod before the rings have been spread sufficiently to cause their outer surfaces to be brought into close contact with the walls of the cage, the ring 40 only will be worn away by the piston rod until said ring has contracted sufficiently to expand said rings into close contact with the cage walls, after which ring 41 will also be contracted and caused to take its due proportion of piston rod wear. This compensation will be continuous throughout the life of the scraping element.

The location and inclination of the conical joint separating the rings 40, 41 of the sectional metal annulus may be varied, but will preferably be substantially as illustrated in Figs. 6 and 8 so as to divide the inner surface of the annulus along a circumferential line 50′ (Fig. 6) intermediate the margins of the annulus, and the inclination will be at an angle of substantially 45° with the axis of the cage. The conical joint will preferably be so disposed as to cause the line of separation between the two rings at the outer periphery of the annulus to coincide with one of its margins, thereby providing the ring 40, which has the undercut surface 42, with a peripheral surface equal in width to the entire width of the annulus to receive the spring 50. The thickness of the rings 40, 41 and the strength of the spring 50 will preferably be so proportioned that the rings may be maintained in close scraping contact with the surface of the piston rod by the spring irrespective of any slight variance between the normal curvature of the rings and the curvature of the piston rod.

In order to facilitate the application of the cage to the piston rod, it should preferably be built up of segments. As herein disclosed (see Fig. 5), each cage comprises two segments which may be secured together by machine screws 51 or other appropriate fastening devices. Such devices constitute satisfactory means whereby the corrugated elements of the spring 50 may be sufficiently stressed between the inner surface of the cage and the outer surfaces of the enclosed ring segments, to keep the scraper elements in constant scraping contact with the surface of the piston rod.

It is important that the oil or other liquid removed from the piston rod by the scraper unit be drained away and permitted to return to the crank-case or other reservoir provided therefor. When two or more scraper units are used in a side-by-side relation as indicated in Fig. 2, this drainage of removed liquid may be facilitated by providing spacers or other separating means between the respective units and between one of the end units and the adjacent wall of the casing. Said spacing means should be of an openwork character so as to provide ports for the drainage of the liquid. In the form of the invention herein disclosed, each of the cages is provided with a circumferential series of spaced projections 52 extending in an axial direction from one of its faces. The inner surfaces of these projections should be at a greater distance from the axis of the cage than the radius of the opening for the piston rod, so as to provide for a free flow of liquid between the projections and the rod. The flow of liquid from the scraping means to the ports 53 between the projections 52 may be further facilitated by chamfering the wall of the cage immediately surrounding the piston rod and lying within the series of projections, as indicated at 54 (Fig. 6).

The scraper units are placed in the casing with the projections 52 and intervening ports 53 facing in the direction from which the oil is moved by the piston rod towards the partition or wall plate to which the casing is attached, so that when packing rings are associated with the scraper units the liquid will be removed from parts of the piston rod approaching the packing rings before passing through the same.

Preferably the ports 53 will be spaced all about the cage as shown, so that in any position of the cage those in its upper portion may serve as vents for those in its lower portion through which liquid may be drained.

To provide for the escape of oil or other liquid removed from the piston rod by the scraper units, to the crank-case or other oil receptacle, ports 55 may be provided in any appropriate part of the casing wall, as indicated on Figs. 2 and 7. The disposition of such ports may be modified to suit the particular type of power unit to which the scraping device is applied, being somewhat differently located when applied to a power unit having a vertically-reciprocating piston than when applied to a power unit having a horizontally-reciprocating piston.

The improved piston rod scraping units of this invention may be used as parts of power units in positions in which packing is not required or in positions in which packing is needed to prevent the flow of fluid through the opening in the wall plate for the piston rod in either or both directions. The casing illustrated in Figs. 1 and 2 is indicated as having a chamber 28 within which may be inserted a suitable type of packing comprising sectional metal rings 56, 56, (Fig. 2), shown in detail in Figs. 3 and 4. These rings may comprise a plurality of segments 57 of such dimensions that their ends will be slightly separated, when in use, as at 58, to allow for wear. The ends of the segments 57 may be spanned by bridging segments 59, and the six segments may be grooved at their outer peripheries and provided with suitable resilient means, such as the garter spring 60, whereby they may be contracted so as to constantly maintain the inner surfaces 61 of the segments 57 in snug contact with the surface of the piston rod to which the device is applied.

A pair of sectional rings like or equivalent to the one illustrated in Figs. 3 and 4, when placed in the chamber 28 (Fig. 2) with the slots 58 disposed in a broken-joint relationship, will effectively seal the joint surrounding the piston rod in the wall plate against leakage, whether the sealed element of the power unit is intermittently subjected to fluid pressure, or intermittently exhausted, or exhausted and subjected to fluid pressure in alternation.

To be most effective, the packing rings 56 and scraper units 35 should be of combined widths substantially conforming with the distances between the walls of the casing between which they are placed. The widths of the packing rings 56 should be such as to provide a working clearance to permit the segments to be moved into contact with the piston rod by the spring 60 and to allow for further slight movements thereof to compensate for wear. If desired, the widths of the cages 36 may be such as to fit snugly between the walls 23 and 25 of the casing, thereby making it possible to adjust them to positions concentric with the piston rod in which they may be supported by friction clear of the surface of the rod. Preferably, however, the combined width of the cages 36 will also be such as to provide a working clearance between the walls of the cages and the chamber 29, so that the scraper elements as a whole, including the cages, may float in the casing to compensate for lateral movements of the piston rod, the springs 50, clamped between the scraper ring segments and the cages, being relied upon to keep the inner surfaces of the cages separated from the surface of the piston rod.

It will be apparent that oil or other liquid on the surface of the piston rod as it approaches the first of the scraper units will be separated from said surface, since it will be unable to pass either between the scraper rings and the piston rod or between the scraper rings and the walls of the cage within which they are housed. The removed liquid will, therefore, be caused to flow into the groove formed by the chamfering of the cage wall at 54, through the ports 53 between the separators 52, and will escape through the ports 55 in the casing wall, from which means it may be directed in any suitable manner to the crank-case or other appropriate reservoir.

Any slight film of oil which may pass the first of the scraper units may be separated by means of the second and third units, so that when the surface of the piston rod arrives at the packing rings 56, if used, or at the portion of the power unit entered by the piston rod, if the packing rings are not used, it will be substantially free from oil or other liquid.

The foregoing piston rod scraping device either with or without the packing rings constitutes a simple self-contained unitary structure adapted to be quickly and satisfactorily substituted for the standard equipment of the prior art upon which it is designed for use as an improvement.

The invention is not intended to be limited to the preferred form herein selected for purposes of illustration, but should be regarded as covering modifications and variations thereof within the scope of the appended claims.

What is claimed is:

1. A piston rod scraper comprising a sectional metal annulus of which the cross-sectional form is of greater width than depth, said annulus comprising discontinuous complemental rings disposed in a side-by-side broken-joint relationship and separated by a conical joint dividing the inner surface of the annulus along a circumferential line intermediate its margins, the circumferential dimensions of said rings being such as to cause their opposed ends to be slightly separated when in use on a piston rod, a cage for said annulus having spaced annular wall portions between which the rings of the annulus may be confined, said cage being of sufficient internal diameter to provide a free working clearance about the piston rod, and resilient means whereby the ring which is undercut at the conical joint may be contracted and thereby caused to exert a wedge-like action on the complemental ring as a consequence of which the rings will be spread axially and held in close contact with each other and with the confining walls of said cage as well as in scraping contact with the surface of the piston rod, said parts being thus self-adjustable to compensate for wear in such manner as to be held in close contact throughout the life of the scraper.

2. A piston rod scraper comprising an annular cage of an internal diameter such as to afford a free working clearance about a piston rod, an internal annular chamber in said cage, a scraping means in said chamber, the portion of one of the walls of said cage immediately surrounding the opening for the piston rod being chamfered to facilitate the flow of liquid removed by the scraping means, and spaced projections extending from said wall to cooperate with an abutting surface to form ports to drain such removed liquid.

3. A piston rod scraper comprising an annular cage of an internal diameter such as to afford a free working clearance about a piston rod, an internal annular chamber in said cage, a scraping means in said chamber, and a circumferential series of spaced projections extending axially from one of the walls of said cage to serve as a separating medium between said cage and an opposed surface, the inner surfaces of said projections being at a greater radius from the axis of the cage than that of the piston rod on which the cage is intended to be used, the spaces between said projections serving as ports to drain off liquid scraped from a piston rod by said scraping means, the portion of the wall of said cage lying within said projections and immediately surrounding the opening for the piston rod being chamfered to facilitate the flow of liquid from the scraping means to said ports.

4. A piston rod scraper comprising a plurality of annular cages each having a scraping means therein and each having a circumferential series of spaced projections extending axially from one of its walls to cooperate with an adjacent cage or casing wall to form ports to drain off liquid removed from a piston rod by said scraping means.

5. A piston rod scraping device comprising a casing having spaced wall portions with aligned openings therein of a diameter sufficient to provide a free working clearance about the piston rod with which the device is intended for use, a plurality of annular cages in said casing between said wall portions, scraping means within said cages, spacing means separating said cages from each other and from one of said wall portions, ports in said spacing means to drain the liquid removed by each scraping means from its respective cage, and ports in said casing to provide for the escape therefrom of liquid drained from said cages.

6. A piston rod scraping device comprising a plurality of internally-grooved cages to surround the piston rod, a scraping ring in each cage, resilient means confined between the base of the slot of each cage and its scraping ring to maintain the ring in scraping contact with the surface of the rod, and mounting and circumferentially-spaced separating means to maintain said cages in a mutually-spaced relation along the surface of the piston rod, said cages being free to float laterally with respect to each other and with respect to the mounting means to compensate for slight irregularities in the surface of the rod.

In witness whereof, we have hereunto signed our names.

EDGAR N. FOX.
EDMUND HAMPSHIRE.